United States Patent
McGrath et al.

(10) Patent No.: US 6,934,747 B1
(45) Date of Patent: Aug. 23, 2005

(54) COMPUTER NETWORK INDICATING RELATEDNESS OF ATTRIBUTES OF MONITORED TERMINALS

(75) Inventors: Andrew McGrath, Ipswich (GB); Peter M Platt, Ipswich (GB); Jeremy M Bowskill, Woodbridge (GB); Jason Morphett, Ipswich (GB); Alison J Willard, Colchester (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/646,384

(22) PCT Filed: Apr. 15, 1999

(86) PCT No.: PCT/GB99/01149

§ 371 (c)(1),
(2), (4) Date: Sep. 18, 2000

(87) PCT Pub. No.: WO99/54822

PCT Pub. Date: Oct. 28, 1999

(30) Foreign Application Priority Data

Apr. 17, 1998 (EP) ............................................ 98302981

(51) Int. Cl.⁷ ............................................ G06F 15/173
(52) U.S. Cl. ........................ 709/224; 709/223; 345/418; 345/581; 345/619
(58) Field of Search ................................ 709/223–224; 345/418, 581, 619, 782, 1

(56) References Cited

U.S. PATENT DOCUMENTS 5,307,415 A    4/1994  Fosgate
5,515,078 A    5/1996  Greschler et al.
5,533,129 A    7/1996  Gefvert
5,796,951 A *  8/1998  Hamner et al. ............. 709/223
6,029,195 A *  2/2000  Herz .......................... 725/116

FOREIGN PATENT DOCUMENTS

WO    98/47083    10/1998
WO    99/30494     6/1999

OTHER PUBLICATIONS

"Open View: A Guide to Hewlett–Packard's Network and Systems Management Platform," Nathan J. Muller, CBM Books, 1995.*
M. P. Hollier et al., "Spatial Audio Technology for Telepresence", BT Technol J, vol. 15, No. 4, Oct. 1997, pp. 33–41.

* cited by examiner

*Primary Examiner*—Frantz B. Jean
(74) *Attorney, Agent, or Firm*—Nixon & Vanderhye P.C.

(57) ABSTRACT

Each terminal of a computer network can monitor the activities of the other terminals or associated equipment such as a telephone and display these activities in visual and/or audible form. The display may be represented as a "virtual world", and/or a generative music system such as "Koan". The nature of the activities performed by the terminal itself also control the display, for example giving greatest prominence to those terminals engaged in similar or related activities. A terminal may be configured to act as a specified user's "base" terminal, to display the activity of the specified user, by identifying whether the specified user's identity is being used on another terminal. The activity of this terminal can then be displayed on the "base" terminal. The base terminal can therefore indicate the absent user's availability, level of activity, etc. to colleagues working nearby.

16 Claims, 9 Drawing Sheets

COMPUTER NETWORK INDICATING RELATEDNESS OF ATTRIBUTES OF MONITORED TERMINALS

BACKGROUND OF THE INVENTION

1. Field of the Invention

This invention relates to computer networks and their operation. The use of computers is becoming increasingly common in all types of business. By linking computers together through private networks (so called Local Area Networks, or LANs) or a public network such as the "Internet" it is possible for many people to co-operate on a project without being in each other's physical presence. The individuals may be anywhere in the world, and still work together. Remote working in way is known as "teleworking".

2. Description of Related Art

A problem with teleworking is that the creative atmosphere of an office full of people is lost. While working in isolation can be productive for certain activities demanding concentration, the ambience of an office or laboratory is better for generating informal and serendipitous associations. The problem of teleworking is that workers lose awareness of what their colleagues are doing, which can lead to a breakdown in company or group culture.

SUMMARY OF EXEMPLARY EMBODIMENTS

According to one aspect of the invention, there is provided a computer network comprising a plurality of user terminals, each having means for indicating a plurality of attributes relating to the terminal or a user of that terminal, means for monitoring one or more of the terminals, and identifying the attributes of the terminals so monitored, means for displaying on at least one displaying terminal information relating to the attributes of the terminals monitored thereby, wherein the displaying terminal is arranged to display an indication of the relatedness of the attributes of the respective monitored terminals to those currently indicated by the displaying terminal.

The attributes of a given terminal may relate to the activities currently performed by the user of that terminal. This invention allows distributed groups of people to maintain an awareness of each other. In one implementation the display on a first terminal is selected to be indicative of the relatedness of the current attributes of the terminals, to the current attributes of the first terminal. The display may be visual, by means of a screen image, or audible, by means of sounds, or both.

In another implementation, a computer terminal may be configured to record as an attribute the identity of a specified user, and track activities of the user when working elsewhere, for example by monitoring the network and identifying whether that user's identity is being used on another terminal, and what activities are currently in use at that terminal.

In a preferred embodiment, the system operates agent-based operators. Each terminal operates one or more agent applications, which identify the attributes of the terminal or its user. Terminals requiring to interact with other terminals have further agents which identify the nature of the interaction required, and two terminals' agents interact to determine an appropriate manner in which the interaction may take place, and to carry it out.

BRIEF DESCRIPTION OF THE DRAWINGS

Various embodiments are envisaged within the scope of the invention. Several of these will be discussed below, with reference to the accompanying drawings, in which.

DETAILED DESCRIPTION OF EXEMPLARY EMBODIMENTS

Figure 1:
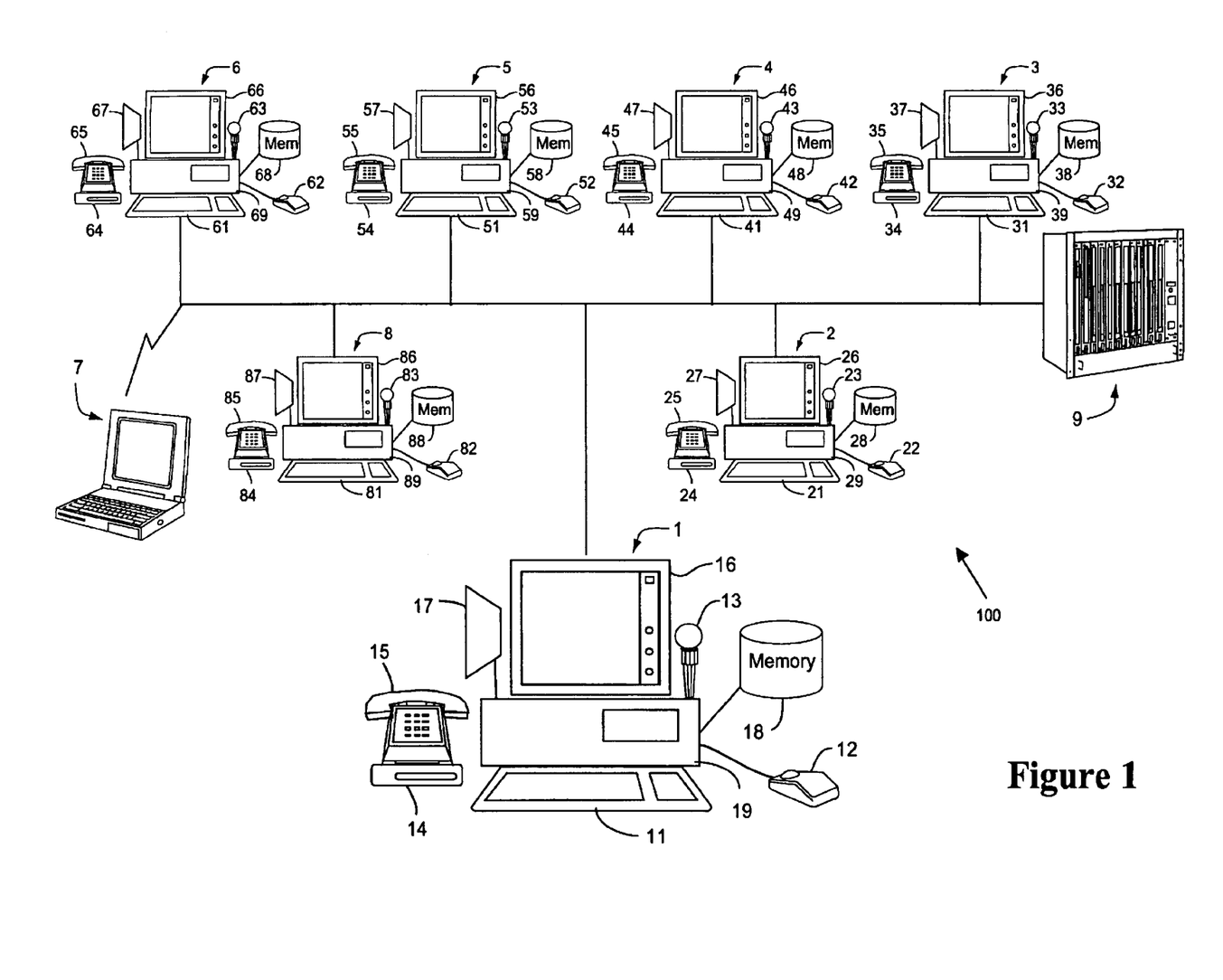
FIG. 1 illustrates a typical computer network, illustrating at least one terminal in detail.
Figure 2:
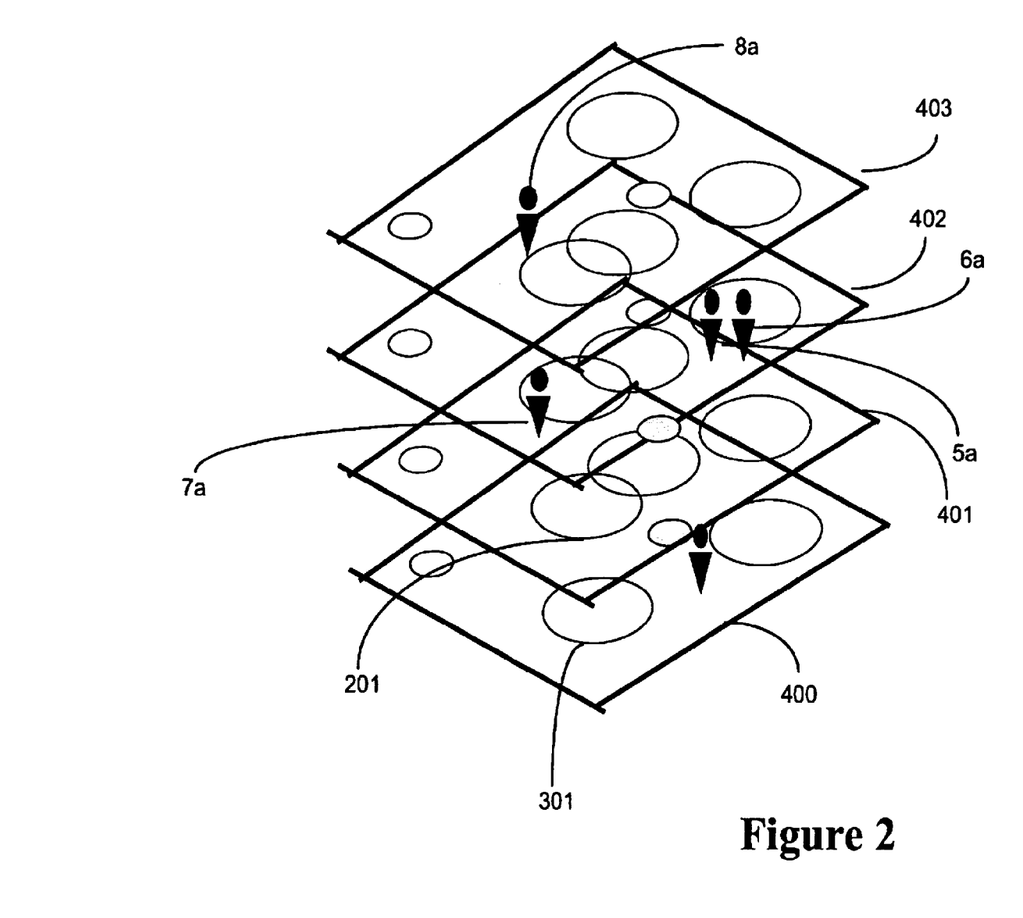
FIGS. 2 to 7 illustrate various screen images displayed to a user of the system.
Figure 3:
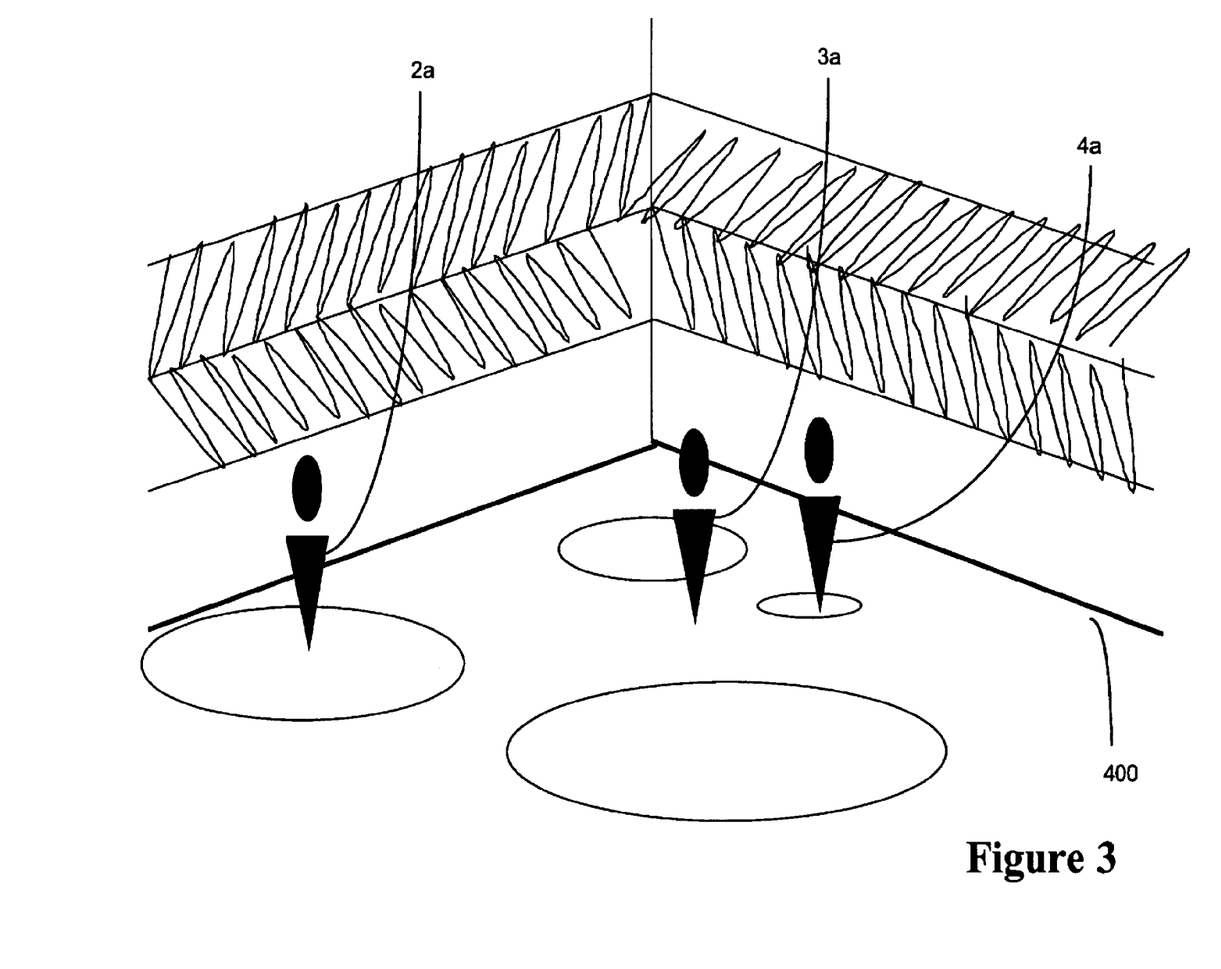

FIG. 1 shows a network 100 serving several computers 1, 2, 3, 4, 5, 6, 7, 8, 9. (The same reference numerals will also be used to represent the users of these terminals, and avatars representing them in the "virtual environment" representation displayed by these computers are labeled with the same reference numbers and suffix "a" (e.g., avatars 1a–8a)). Links between the individual computers may be permanent hard-wired connections, virtual connections (permanent as perceived by the user, but provided over shared lines by the telecommunications provider), or dial-up connections (available on demand, and provided on a pay-per-use basis), and may include radio links, for example to a mobile terminal 7. One of the computers (9) acts as a "server", co-ordinating the interactions of the other computers. This computer 9 may also have similar functionality to the others, but as shown it is dedicated to the server function only.

One of the computers (1) is shown in more detail. It comprises one or more input devices, such as a keyboard (11), mouse (12), and audio input (13), and means (14) for monitoring the activity of associated devices such as a telephone (15). It also comprises one or more output devices, such as a screen (16) and audio output (17). As is conventional, the computer (1) also comprises a memory (18) and a central processor (19). As will be understood, computer 2 has equivalent devices 21–29, and similarly for computers 3, 4, 5, 6, 7, 8. For example, computer 3 includes equivalent devices 31–39, computer 4 includes equivalent devices 41–49, 51–59 computer 6 includes equivalent devices 61–69 and computer 8 includes equivalent devices 81–89. The computers 1, 2, 3, 4, 5, 6, 7, 8, 9 do not all need to have all the input devices and output devices specified above.

Each computer 1, 2, 3, 4, 5, 6, 7, 8 communicates with the server computer 9 to arrange user access rights, and to define user groups. Any user 1 (i.e., a user operating computer 1) may instruct the server 9 to re-define his own user group to add or delete users.

When a computer 1 is switched on, the user is requested to identify himself and the user identity is passed to the server computer 9. Whenever the user 1 accesses a computer application, whether this requires the use of data from the server or only operations requiring the use of the computer's own memory 18 and central processor 19, the user's operation of this application is communicated to the server 9. The computer 1 is also arranged to communicate to the server 9 certain other activities, such as keyboard strokes or the accessing of specified computer files, indicative of the subject the individual user is currently working on. The activities to be communicated to the server 9 by the computer 1 may be defined in the operating system of the computer 1, or by the server 9.

The server computer 9 returns data to each user 1 relating to which other members 2, 3, 4, 5, 6, 7, 8 of the pre-defined user group are currently on-line, and information about the applications they currently have running, and their current subjects of interest. This is represented to the user 1 on a display device, the representation being related also to the user's own current status, such that users 2, 3, 4, 5, 6, 7, 8 working on similar subjects to the user 1 can be readily identified. The representation may be generated either by the server 9 or by the user's own computer 1. Example representations will be described later.

In one particular embodiment a terminal 8 may be arranged to indicate the activity of a specified user. In general, it is envisaged that this will be the terminal at the user's own permanent workstation. When that user "signs in" at another terminal 7, the server recognises the user's identity and transmits a signal to the user's own terminal 8, causing a display to be generated indicating the location and activities of that user. This allows colleagues at the user's home location, where the terminal 8 is located, to monitor his activity and choose whether it is appropriate to contact him.

The attributes stored may relate to users' interests (which may be made to vary with time of day to reflect work time and leisure time), geographical location (which may change if the terminal is portable), and the user's position in a company or other organisation. They may also relate to activities directly related to the user's operation of the computer 1, such as what subject the user is working on (identified by the computer files the user is working on, the content of the document, "Internet" page currently in use, keywords identified in the last few characters typed, and the applications the user has running), other activities which may take place at a work station, such as which input devices 11, 12, 13 are in use, or whether a screensaver is being displayed (a lack of activity suggesting that the user may be away from the computer), whether an associated telephone 15 is in use, or whether an audio input 13 is detecting voices, suggesting that the user is in conference.

The display on the screen 16 of the computer terminal 1 may take the form of a "virtual environment", (illustrated in FIGS. 2 to 7) in which users (including the user of the computer 1 himself) using associated applications are represented as being closer together than users working on disparate subjects. The viewpoint in the virtual environment will depend on the position of the user within it, which in turn depends on the application the user is working on. As the user operates the various input devices 11, 12, 15 of his terminal 1, the server 9 interprets these activities to control the user's position and viewpoint.

Sound effects may either supplement or replace the visual display to give an ambient sound effect, which varies according to the context the user 1 is working in. These may be artificially generated sounds, pre-recorded, or live sound transmitted from the other users' terminals 2, 3, 4, 5, 6, 7, 8. These sounds may be varied, for example in amplitude or pitch, according to the proximity in the virtual space of the users represented by them. The use of sound has particular benefit in virtual environments in which part of the environment is out of the field of view of the user. Spatialised sound may be used to facilitate the location, by the user, of the sound sources in the virtual environment. Suitable spatialised systems are described for example in U.S. Pat. No. 5,533,129 (Gefvert), U.S. Pat. No. 5,307,415 (Fosgate), article "Spatial Audio Technology for Telepresence" by M. Hollier, D. Burraston, and A. Rimell in the *British Telecom Technology Journal*, October 1997, and International Patent Specification WO98/58523.

Several modes of operation of the system illustrated in FIG. 1 will now be described with reference to the drawings. In the first mode, represented in FIGS. 2 to 7 as may be shown in the system illustrated in FIG. 1, the user moves through a "virtual environment" which has a number of predetermined activities, and various levels at which the user can be operating on those activities. Users working on the same subject will appear near to each other in the world.

The server 9 loads the virtual environment application into the user's terminal 1, for display on the screen 16, and updates it in response to the activities of the individual users 1, 2, 3, 4, 5, 6, 7, 8. The virtual environment is represented by a number of levels 400, 401, 402, 403 (see the screen illustrated in FIG. 2 in conjunction with the system illustrated in FIG. 1). Each user 1 is represented on the corresponding screens 26, 36, 46 etc of the other users 2, 3, 4 etc. The user 1 can navigate freely about the world, including moving between levels, and correspond with other users, using electronic mail, videoconference, or other available means.

The representation of the user's position, both on his own display device and those of the other users, is driven by the server 9 interpreting the activities of the user, for example operation of the mouse 12, keyboard 11, telephone 15, etc.

The user is generally presented with a viewpoint of this virtual environment as seen from a ground level 400 (see the screen image illustrated in FIG. 3 in conjunction with the system illustrated in FIG. 1), representative of his own designated working area. Other users 2, 3, 4, 5, 6, 7, 8 in his designated user group are represented by "avatars" 2a, 3a, 4a, 5a, 6a, 7a and 8a, respectively (see the screen images illustrated in FIGS. 2–7 in conjunction with the system illustrated in FIG. 1) positioned in the virtual space according to their current activities. The user 1 is initially represented in an open space, and arranged to be looking towards certain other users 2, 3, 4 in the user group selected to be those with whom the user shares some common interest, those currently working in similar subjects to the user 1 being arranged closest to the viewpoint of the user 1, whilst those who, although having the same interest, are currently working in some other activity, are more remote.

Figure 4:
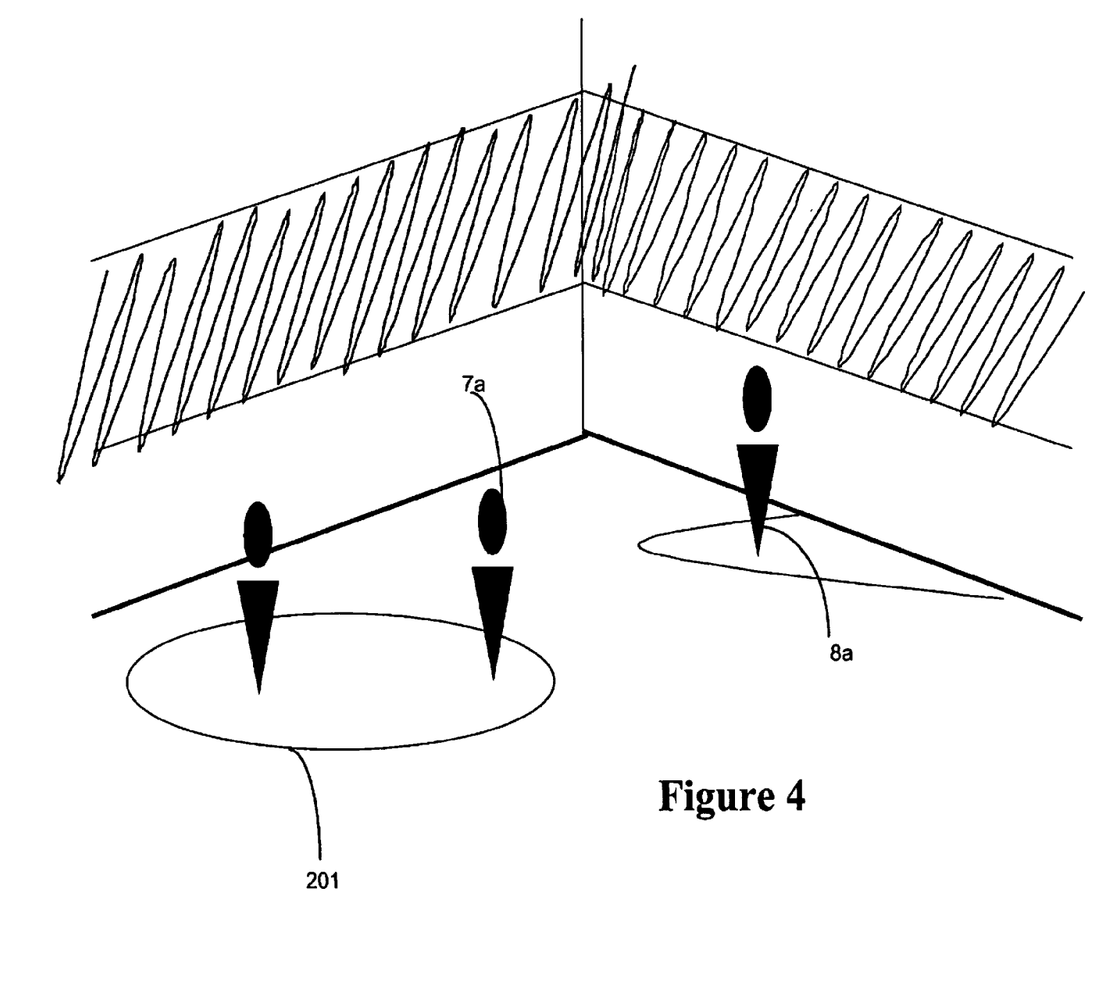
Figure 5:
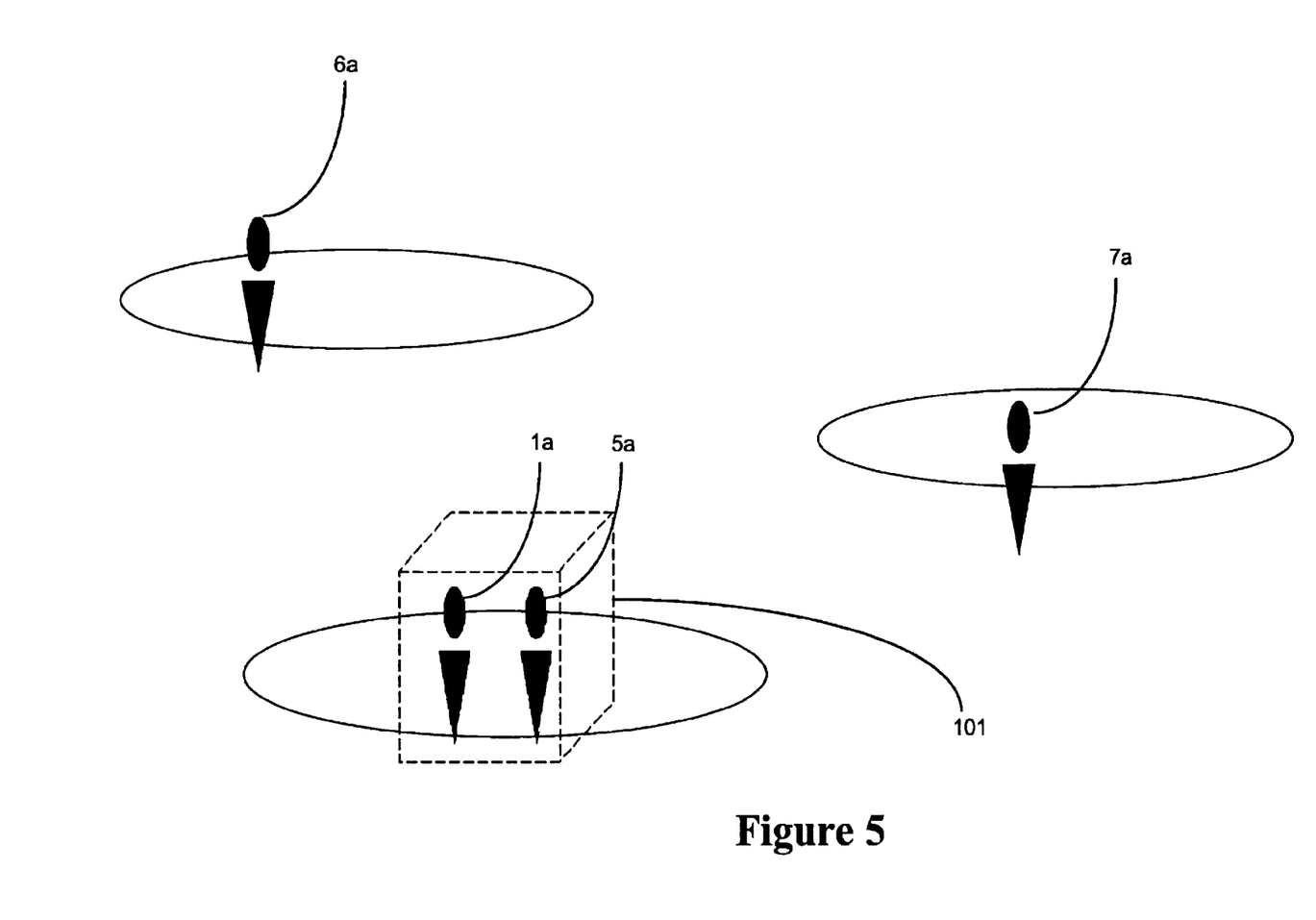

As shown in the screen image shown in FIG. 4 in conjunction with the system illustrated in FIG. 1, as the user 1 works on different subjects (identified by the server 9 according to the computer files and applications in use, key strokes, etc), his respective avatar 1a is moved to a part of the virtual environment representing an "interest area" 201 (see also FIG. 2) relating to that subject, and changed in appearance (for example colour) to reflect the fact that the user is busy. Avatars 7a, 8a of other users 7, 8 who share an interest in this subject will be located in the same interest area of the virtual environment, at an appropriate level to their current activities.

If a user carries out an activity such as document downloading, searching the Internet, or having a meeting, his avatar is moved to one of the other levels 401, 402, 403, each representing one such activity. (see the screen image illustrated in FIG. 2 in conjunction with the system illustrated in FIG. 1) Users from other groups engaged in similar activities will be found there. This allows interactions to take place between members of different interest groups when they are engaged on similar activities. This emulates the behaviour of personnel in a real office environment, where workers from different working groups may discover matters of common interest during chance encounters in common areas of the office such as in the corridor or by the photocopier, but would not wish to disturb each other when concentrating on work specific to their group. These matters of common interest may relate to the activity represented by the level the users meet on, but may be unconnected to it.

When a user first "logs on" to his terminal 1 to start a session, the user first appears on an "entry" level 403, to allow such encounters to take place before the users get involved in more specialised activities at the "ground level" 400, and to gain an "overview" of who is already present in the virtual environment. (see the screen image illustrated in FIG. 2 in conjunction with the system illustrated in FIG. 1). After a short interval, if the user does not initiate an interaction at this entry level, the server 9 automatically moves the user 1 to the ground level 400, as shown in the screen image illustrated in FIG. 3 in conjunction with the system illustrated in FIG. 1.

Sound may be used to support the visual information represented on the screen 16, and create a more lifelike ambience. In a real office environment hearing is the primary awareness cue. Consequently, in an open-plan office, occupants are usually aware of each other's presence even when they are not in view. The system is therefore arranged to provide auditory awareness of specific people—for example the members of a specified group, and/or those nearby in the virtual environment.

The users can navigate freely about the virtual environment. If the user 1 wishes to discuss matters relating to another interest group, he can navigate to the relevant interest group 301 (see FIG. 2) on the ground plane 400. The user can then arrange to converse with another user 5 in that interest group, for example using electronic mail, by identifying the relevant avatar 5*a* and transmitting the required text.

The user 1 may wish to enter a different mode of communication, e.g. an audio link, with the other user 5. As shown in the screen image illustrated in FIG. 5 in conjunction with the system illustrated in FIG. 1, the user 1 selects the two avatars 1*a*, 5*a* (for example by using a "mouse" 12 to "click" on the respective avatars), and entering a command to cause the server 9 to set up a telephone connection between the user's respective telephones 15, 55, or the audio input/output devices 13, 17, 53, 57. The other people 6, 7 nearby in the virtual environment receive a visual indication that the two users 1, 5 are in audio communication, by the representation of an "audio zone" 101 surrounding their avatars 1*a*, 5*a*. The users 1, 5 may select the discussion to be private, or alternatively may allow the server 9 to arrange for part of the conversation may be fed (at low bit rate and amplitude) into the audio outputs 27, 37, 47 etc of the other users, so that another user e.g. user 6, can "overhear", the conversation and join in if he wishes to contribute. To do so, the user 6 moves into the 'audio zone' 101, for example by moving his avatar 6*a* under control of his mouse 62. The server 9 responds to this movement by establishing a three-way conference call, connecting user 6, by means of his telephone 65 or other audio devices 63, 67, to enter the conference at full bandwidth.

Figure 6:
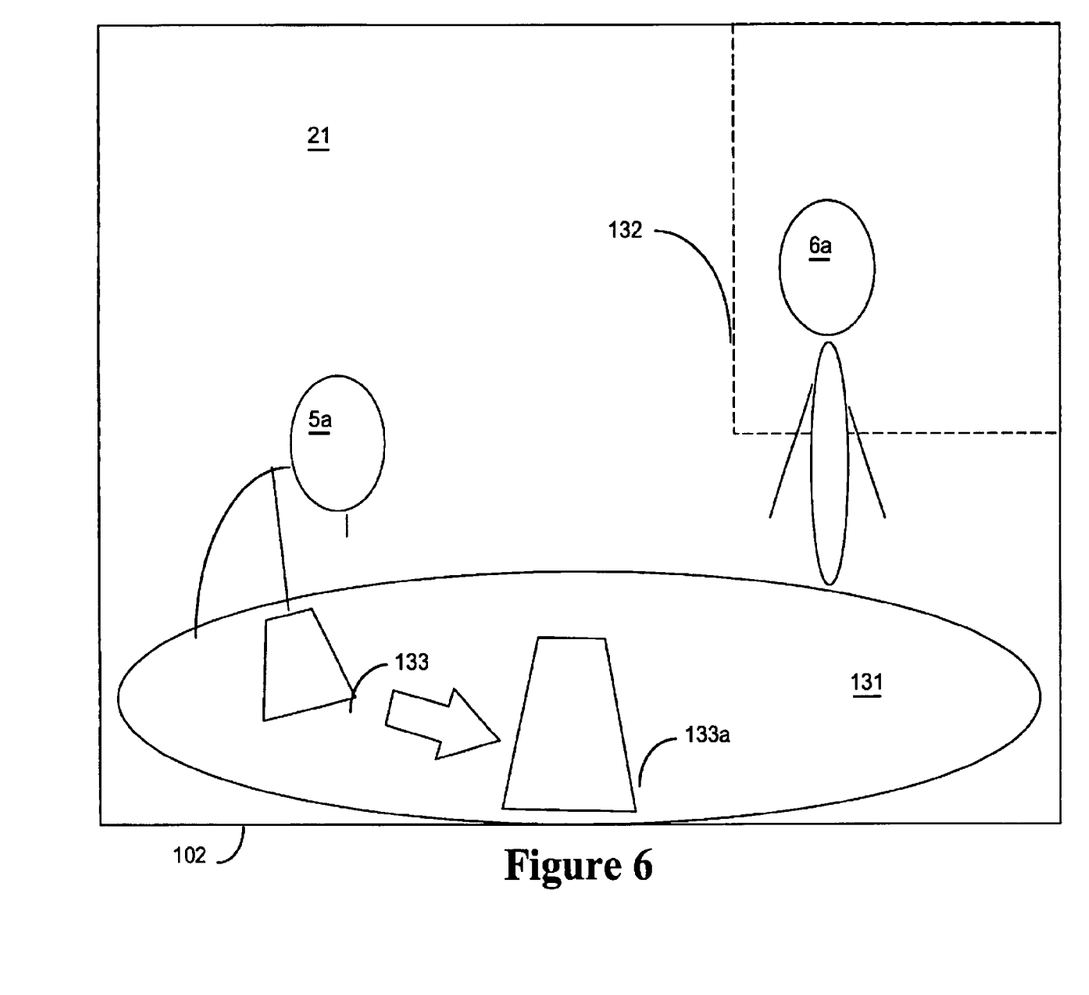
Figure 7:
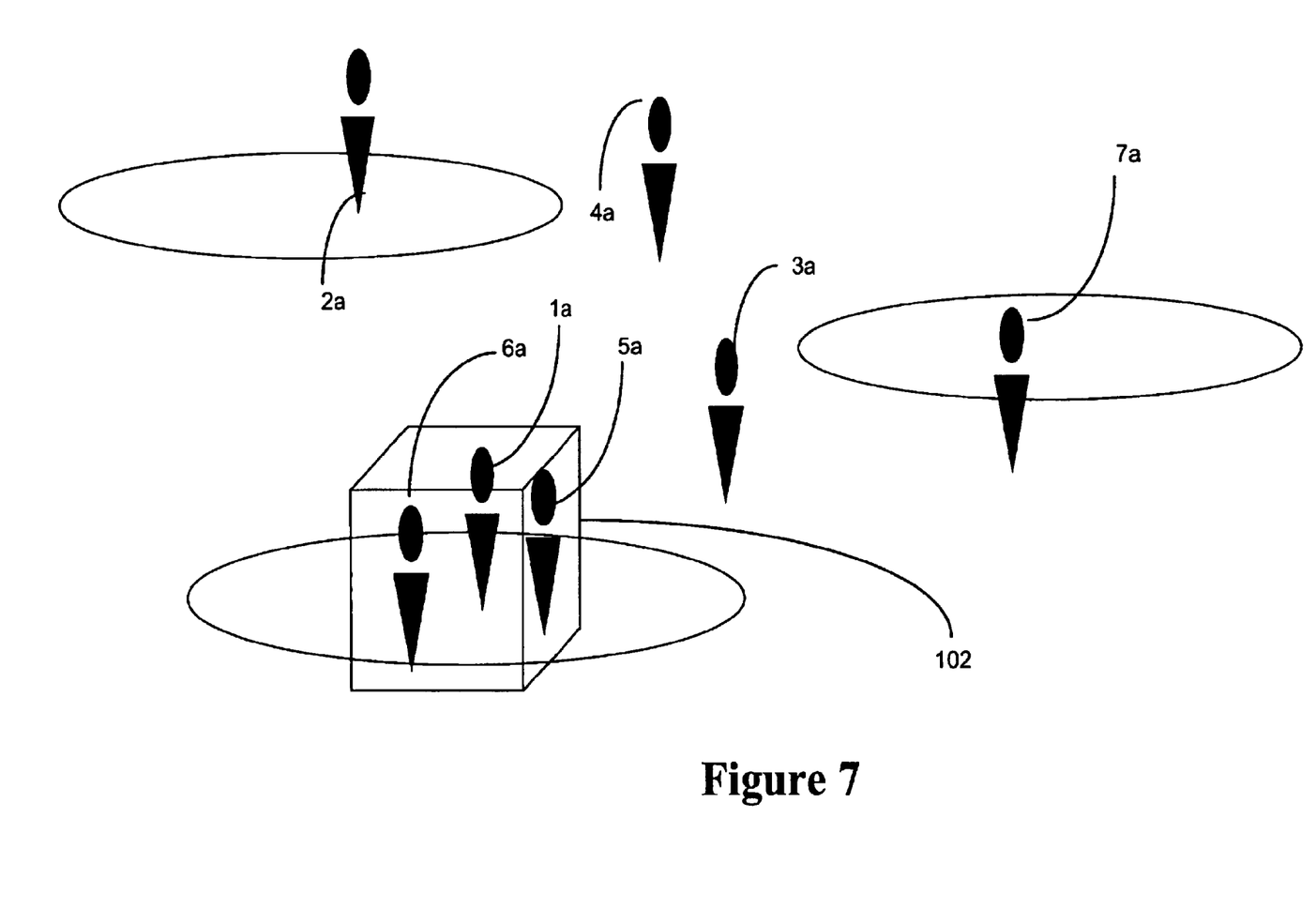

Any of the users 1, 5, 6 can, if desired, cause the discussion to continue in a more formal "virtual meeting space" 102, for example of the type described in International Patent Specification PCT/GB98/03555 filed on Nov. 27, 1998, and illustrated in FIG. 6 in conjunction with the system illustrated in FIG. 1. This system has facilities such as a shared whiteboard, document distribution, document sharing, etc. Any of the users 1, 5, or 6 can create the "meeting space" 102 by entering an appropriate command using an input device (e.g. the respective "mouse" 12, 52, 62) to instruct the server 9 (or one of the individual user equipments 1, 5, 6) to activate the meeting space application, and to instruct the individual user equipments 1, 5, 6 to interact with the meeting space application to display to each user, using their respective display devices 16, 17, 56, 57, 66, 67, the activities of the users 1, 5, 6 within the meeting space 102, as indicated by the individual users' use of their respective input devices (11, 12, 13, 51, 52, 53, 61, 62, 63).

As the meeting space application 102 is activated, various conferencing tools appear such as a table 131 (see FIG. 6, whiteboard 132 and so on and the avatars 1*a*, 5*a*, 6*a* start to 'act out' the interactions between each other. As shown in FIG. 6 in conjunction with the system illustrated in FIG. 1, the meeting space 102 is displayed to each user 1, 5, 6 from the viewpoint of that respective user, so the user to whom it is displayed (user 1 in this example) does not appear. Other people 2, 3, 4 in the social space, not involved in the meeting, are given an indication that the users 1, 5, 6 are in a private meeting and cannot overhear any of the discussion (see the screen image illustrated in FIG. 7 in conjunction with the system illustrated in FIG. 1). These other users 2, 3, 4 are not represented in the meeting space 102, although the overall virtual environment 100 may be represented in a "window".

Any user 5 in the meeting space 102 can show a document to the other users 1, 6, in the space by entering the details of the document, and a representation 133, 133*a* of the document then appears on the table in front of each avatar 1*a*, 5*a*, 6*a*. A user can select the document (by "clicking" on its representation 133 and the document appears in a two dimensional "window" in the respective display 16, 56, 66 for him to read.

A user 6 may take notes by "clicking" on a representation of a whiteboard 132, causing the respective avatar 6*a* to move to the whiteboard in the viewpoint of the other users 1, 5, whilst the user 6 is presented with a full-screen image of the whiteboard on which text, etc, can be entered.

Users may leave the meeting space 102, or request admission, at any time—their departure from and entry to the meeting space 102 being represented by appropriate movement of the avatars in the representations of the overall virtual environment 100 or meeting space 102 displayed to each user 1, 2, 3, 4, 5, 6, 7, 8, in the same way as the audio zone 101 can be entered and left, except that access to the meeting zone 102 may be refused by the current occupants of the meeting zone. If the meeting is closed, the meeting space 102 is replaced by an informal audio zone 101 similar to that of FIG. 5 in conjunction with the system illustrated in FIG. 1, surrounding any participants 1, 5 present in the meeting zone 102 at the time of closure.

If a first user 1 wishes to contact another specific user 2, but does not know when the other user 2 is available, the first user 1 selects the avatar 2*a* of the other user 2, and the server 9 generates a sound output representative of the current activity of the other user 2. This sound output changes when the other user 2 becomes available. For example when the other user is available a 'background noise' is generated, representative of the other user 2. This background noise could be a sample of speech, or a low bit-rate audio feed could be used.

The server 9 infers the availability of the user 2 based on the applications running on the respective computer, the frequency of key presses on the keyboard 21, whether the telephone 25 is in use, the level 400, 401, 402 etc the user 2 is currently assigned to etc. The degree of availability may be used to vary audio amplitude or other characteristics, to indicate how likely the user 2 is to welcome an interruption. If the user 2 is not currently logged on, the sound level is zero.

The system may also be used as an "intelligent" screen saver. A computer terminal 3 is allocated to a respective user.

When the user is working elsewhere the system is configured such that it reflects his availability. So for example, if the user is currently working at another terminal 4, for example at home, but is willing to be contacted, he can select an 'at work' option, causing the terminal 4 to log on to the server 9 in the conventional way. The server 9 transmits an instruction to the terminal 3 to display a graphic or avatar of the user at a computer. The server 9, by monitoring the operation of the terminal 4, can cause the graphic on the display 37 to indicate the applications being run. Thus people in the office would be able to see from the display 37 on his office terminal 3 that the user is at home and available to be contacted, should he choose to make this known. Similarly, when the user picks up the telephone 45 (as sensed by the telephone 45 itself or at the exchange) the avatar on the display 37 changes so that people know that the user is unavailable to be telephoned, but perhaps still available to be emailed. If both computers 3, 4 have video conferencing capabilities, the system may be arranged such that a user in the office can establish a videoconference with the user 3 by entering a simple command.

Another use for the system of the invention is to determine the form in which information should be sent to a user. The attributes of the user identify the type of terminal in use, and the activities currently engaged in. These can then be used to determine in what form (text, audio, video etc) to transmit the information, and whether to interrupt the user's current activity with the new information, merely alert the user to its arrival, or deliver it without announcement. This decision would be based on the complexity of the task the user is currently engaged on (and hence the degree of inconvenience caused by interrupting it), the relevance to the current task of the information being delivered, and its degree of urgency. The information may be abridged according to the "ProSumm" protocol described in the present applicant's International Patent Specification WO98/47083.

Spatialised audio, of the type which uses a plurality of audio outputs 17, in connection with a movable seat and screen, whose position is monitored by the computer equipment 1, (as described for example in U.S. Pat. No. 5,515,078 (Greschler) may be used to track the user 2 in the virtual environment, and to make audio connections based on which sample or low bit rate audio awareness channel the user 1 is currently facing. For example, the user 1, hearing the voice of user 2, can turn in his seat towards the sound, and hit a button on the keyboard 11. The current position of the seat is used by the computer 1 to identify the required user 2, causing the telephone 15 to ring that user's telephone 25.

The audible output may be conventional audible icons—individual "beeps" to indicate events such as electronic mail arriving, or continuous sound representative of individual users, such as the background sound representative of each user currently logged on. Auditory icons are ideal for alerting users to particular events, but they are less good at conveying continuous states. While it is useful to have a sound to indicate that some new email has arrived in a virtual office environment, it may become distracting if that sound was played continuously until the email is read. If sounds were used to convey other events and states in the office environment such as forthcoming meetings, changes in important documents, the availability of colleagues, etc., then it may become difficult to extract any information at all from the mixture of noises.

For example the presence of mail in a mailbox, the approach of a scheduled appointment, and the whereabouts of nearby users in the virtual environment who are outside the user's field of vision, or too distant to identify readily given the picture resolution of a typical computer monitor, are all characteristics which may require low-level continuous indications, rather than a single sound to indicate an event. The sound may be modified according to the significance of the event—for example the number or urgency of messages, the proximity of the appointment, etc, may be indicated by the amplitude, pitch, or repetition rate of a sound.

This requires a structured approach to delivering auditory information that allows the sound to be organised. A particular example of a continuous indication is music, which can be considered as a system for organising sounds so that the combination of sounds is capable of conveying meaning, and its use in a virtual environment is comparable to the way music is used to support the action in theatre, opera and particularly cinema films. Music as a display device is ideally suited to a virtual environment as, unlike a purely graphical system, it can subtly convey non-specific information without requiring the listener's full attention. This means that as long as the main focus of the work is visually based (e.g. word processing, programming etc.) the music is able to exist alongside the main work activity without causing interruption.

The use of music in theatre and opera is many centuries old, and is also well established in films. There can be little doubt that music can change the sense of environment. For example, an apparently innocuous beach scene in the film "Jaws" (1975) is completely altered by the accompanying music, which alone hints at the sinister approach of the unseen shark. The information in the virtual environment can also be represented using music; each different user of the environment having a particular theme associated with him/her, the rhythm of which is altered to indicate if that person is busy or not. The music provides a continuous indication of the user's level of activity. Clearly it would be distracting were users required to repeatedly check the environment visually to assess the activity of the other users, so the music is provided to provide an ambient awareness of what's going on, to enhance the environment rather than to replace it, allowing users to gain visual confirmation of events detected through the music.

However, although there are many similarities between virtual environments and films, there is clearly one major difference. All of the action that takes place in a film is scripted and pre-planned whereas in an interactive shared virtual environment much of the content and activity cannot be foreseen. Thus the score accompanying a dynamic virtual environment must itself be dynamic and change according to the action taking place. It is possible to provide each event, user, etc, with a musical segment or "leitmotif" which is played in given circumstances. However, this is difficult to arrange and likely to lead to a confused sound, difficult to understand, especially when a lot of activity is taking place.

In a preferred arrangement according to the invention, music is used that does not rely on segments being prepared in advance, but can generate music in real time based on the states and events taking place. "Generative music" is a term used to describe music that is composed by a computer in real time based on a set of static or changing rules and parameters. The music is defined (written) by setting parameters and rules that affect the system's random choices of note pitch, length, rhythm, instrument etc. One particular preferred implementation uses computer-generated music, such as "Koan", discussed on the SSEYO website at http://www.sseyo.com. This application runs on a PC and uses a midi soundcard to produce the music. Koan has built into it many of the rules and organising structures that allow recognisable musical styles to be generated easily, including common western scales as well as Indian and Asian forms. This means that pieces of music can be created that will always conform to these styles but which can have any variety of component parts. The Koan system allows the composer to select from over 200 different musical parameters ranging from note length/pitch through to advanced features of midi sound cards, which can be altered to produce a huge variety of different sounds and musical styles. The system to be described here replaces the human composer by input from the virtual environment 100, which selects the parameters to be input to the system.

In a shared environment where music is used to identify people and their level of activity, the use of a generative music system allows musical parts to be defined for each level of activity for each person. In this method however the parts are not explicitly created, but parameters are set so that the system produces music for each person that will sound similar each time it is played. The advantage of the generative method is that it is possible to associate the different levels of activity directly with the parameter that controls the pitch of the notes. This means that the number of levels of activity does not need to be known in advance, and separate pieces don't need to be created for each possible state. The generative system is able to cope with any number of different states and translate this into a continuous variation in the pitch (or other parameter) of the parts.

Clearly it is feasible to represent information from many sources as changes in the musical composition, but the Koan system is a more scaleable technique that relies on less musical knowledge. The problem becomes merely one of collecting the information and deciding which musical feature to associate it with, the generative music application organises the sounds into a coherent output.

Figure 8:
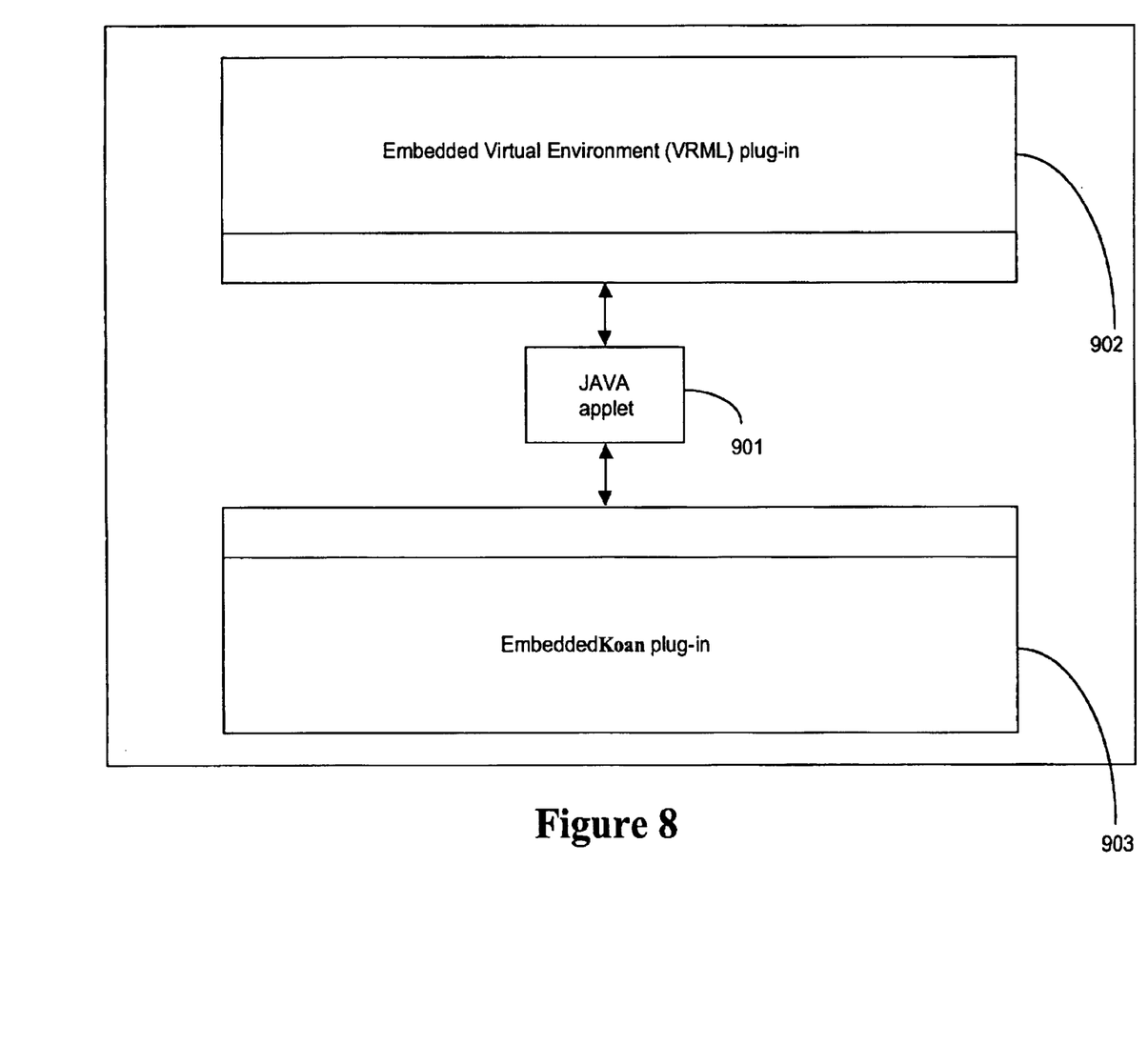
FIGS. 8 and 9 are schematic diagrams illustrating a process for adding an audio input to the system.
Figure 9:
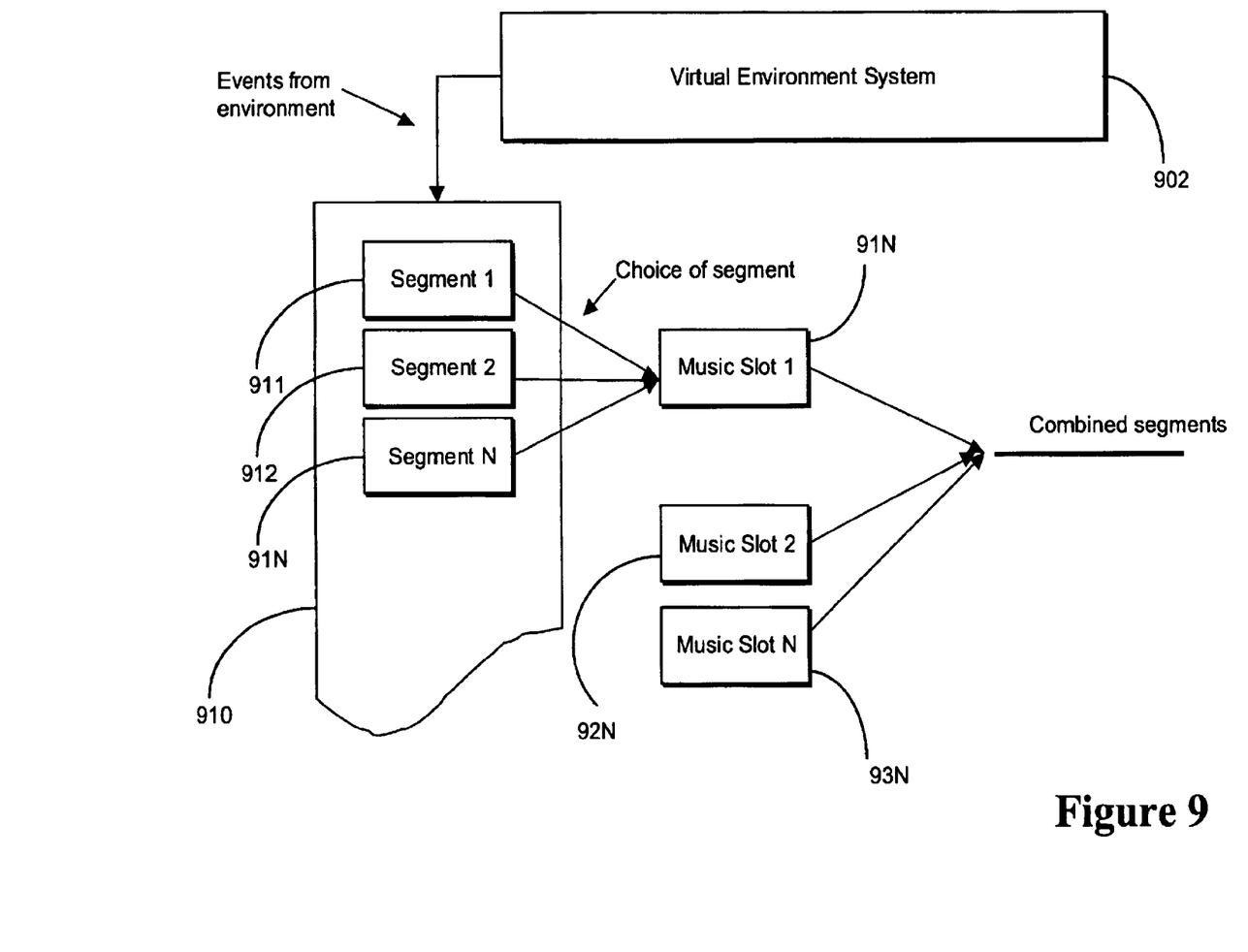

In a practical implementation, shown in FIGS. 8 and 9, a JAVA applet 901 is used to set up communication between the virtual environment 902 and the music application 903. Events in the virtual environment 902 are passed to the applet 901, which then sends the appropriate messages to alter the behaviour of the music application 903. Likewise, changes occurring in the music application 903 may be passed back to the virtual environment 902 using the applet 901, for example to control the direction of a sound source.

An event occurring in the virtual environment system causes a program to be run (either in the server 9 (see FIG. 1) or in an individual terminal 1 (see FIG. 1)) that consults a look-up table 910 to determine which musical segment 911, 912, . . . 91N should be used to represent this event. The selected segment 91N is then added to any other segments (92N, 93N, etc) already selected to be part of the music to be played by the music application 903. The music application 903 combines the selected segments to generate the musical output. The interactions between the segments may be quite complex—the addition of one segment may modify the way in which others are presented. The selected segments 91N, 92N, 93N continue to play, continuously or periodically, until the system determines that another event has occurred requiring a segment to be added or deleted. Certain events may require a segment to exhibit a temporal characteristic, for example getting louder or softer or changing in pitch, according to how recently the associated event occurred.

What is claimed is:

1. A computer network comprising:
a plurality of user terminals, each having means for indicating a plurality of attributes relating to the terminal or a user of that terminal,
monitoring means for monitoring one or more of the terminals,
identification means for identifying the attributes of the terminals so monitored,
means for displaying on at least one displaying terminal information relating to the attributes of the terminals monitored thereby,
wherein the monitoring means monitors the information content of the application each user is working on, the identification means identifies the relatedness of the information content of the application each user is working on, and the displaying terminal displays an indication of the relatedness of the information content of the applications run by the respective monitored terminals to the information content of the applications run by the displaying terminal.

2. A network according to claim 1, wherein the identification means are arranged to identify keywords in the text of a document.

3. A network according to claim 1, wherein each of a plurality of terminals is capable of monitoring and displaying the attributes of the other members of that plurality.

4. A computer network according to claim 1, wherein the display means includes a generator of an audible signal.

5. A computer network according to claim 4, wherein the display comprises a generative music system.

6. A method of operating a computer network comprising a plurality of user terminals, each having means for indicating a plurality of attributes relating to the terminal or a user of that terminal, the method comprising:
monitoring one or more terminals,
identifying the information content of the application each user is working on, and
displaying on at least one displaying terminal an indication of the relatedness of the information content of the applications run by the respective monitored terminals to the information content of the applications run by the displaying terminal.

7. A method according to claim 6, wherein the information content is identified using keywords in the text of a document.

8. A method according to claim 6, wherein each of a plurality of terminals monitors and displays the attributes of the other members of that plurality.

9. A method according to claim 6, wherein the indicating, identification and monitoring are carried out by the interaction of agent-based processing operators.

10. A method according to claim 6, wherein the display is audible.

11. A method according to claim 10, wherein the display comprises a generative music system.

12. A computer network comprising:
a plurality of user terminals, each having means for indicating a plurality of attributes relating to the terminal or a user of that terminal,
means for monitoring one or more of the terminals,
means for identifying the attributes of the terminals so monitored, and
means for displaying on at least one displaying terminal information relating to the attributes of the terminals monitored thereby,
wherein the displaying terminal is arranged to display an indication of the relatedness of the attributes of the respective monitored terminals to those currently indicated by the displaying terminal, wherein the attributes include the activities currently performed by the respective terminals, and wherein the display is a visual display indicating relationships with other users by proximity and direction of view in a three dimensional environment.

13. A computer network as claimed in claim 12, wherein means are provided to control an audio signalling between terminals according to their proximity in the visual display.

14. A method of operating a computer network comprising a plurality of user terminals, each having means for indicating a plurality of attributes relating to the terminal or a user of that terminal, the method comprising:

monitoring one or more terminals, identifying the attributes of the terminals so monitored, displaying on at least one displaying terminal information relating to the attributes of the terminals monitored thereby, wherein the at least one displaying terminal displays an indication of the relatedness of the attributes of the respective monitored terminals to those currently indicated by the displaying terminal, wherein each of a plurality of terminals monitors and displays the attributes of the other members of that plurality, wherein the attributes include the activities currently performed by the respective terminals, and wherein the display is a visual display indicating relationships with other users by proximity and direction of view in a three dimensional environment.

15. A method as claimed in claim 14, wherein an audio signalling between terminals is controlled according to their proximity in the visual display.

16. A computer network according to claim 1, wherein the indicating means, monitoring means and identification means are agent-based processing operators.

* * * * *